United States Patent [19]

Burgdorf et al.

[11] Patent Number: 5,290,098
[45] Date of Patent: Mar. 1, 1994

[54] HYDRAULIC ANTI-LOCKING BRAKE UNIT

[75] Inventors: Jochen Burgdorf, Offenbach-Rumpenheim; Hans-Dieter Reinartz, Frankfurt am Main; Helmut Steffes, Hattersheim; Joachim Maas, Bad Vilbel; Dieter Dinkel, Eppstein/Ts., all of Fed. Rep. of Germany

[73] Assignee: Alfred Teves GmbH, Frankfurt am Main, Fed. Rep. of Germany

[21] Appl. No.: 11,878

[22] Filed: Feb. 1, 1993

Related U.S. Application Data

[62] Division of Ser. No. 700,231, May 14, 1991, Pat. No. 5,215,359.

[30] Foreign Application Priority Data

May 16, 1990 [DE] Fed. Rep. of Germany ....... 4015664

[51] Int. Cl.⁵ .......................... B60T 8/32; B60T 8/48
[52] U.S. Cl. .................... 303/115.4; 303/113.2; 303/116.2; 303/119.1; 303/901; 303/117.1
[58] Field of Search ............ 303/115.5, 115.4, 116.1, 303/116.2, 116.3, 117.1, 113.1, 113.2, 115.1, 116.4, 119.1, 901

[56] References Cited

U.S. PATENT DOCUMENTS

| | | | |
|---|---|---|---|
| 4,618,189 | 10/1986 | Nakanishi et al. | 303/115.4 |
| 4,703,979 | 11/1987 | Nakanishi et al. | 303/115.4 X |
| 4,957,330 | 9/1990 | Morikawa et al. | 303/115.4 |
| 5,094,511 | 3/1992 | Becker et al. | 303/116.1 |

FOREIGN PATENT DOCUMENTS

2199385  7/1988  United Kingdom ............. 303/115.4

Primary Examiner—Douglas C. Butler
Attorney, Agent, or Firm—Robert P. Seitter; J. Gordon Lewis

[57]  ABSTRACT

A hydraulic anti-locking brake unit is presented in which the brake line is shut off by an isolating valve 20 during a control action. For the reduction of the pressure, the outlet valve 7 is opened, so that the pump 14 delivers hydraulic fluid out of the wheel brake into the high-pressure accumulator 19. For a renewed pressure build-up, the inlet valve 6 is opened, so that hydraulic fluid flow is directed out of the high pressure accumulator 19 to the wheel brake. In order to be able to utilize a high pressure accumulator having a low receiving capacity, various valving arrangements are disclosed to direct excess flow from the pump either to the master cylinder or a low pressure accumulator.

9 Claims, 12 Drawing Sheets

HYDRAULIC ANTI-LOCKING BRAKE UNIT

CROSS REFERENCE TO RELATED APPLICATIONS

This is a divisional of U.S. Ser. No. 07/700,231, filed on May 14, 1991, now U.S. Pat. No. 5,215,359 issued on Jun. 1, 1993.

BACKGROUND OF THE INVENTION

The invention is related to a hydraulic anti-locking brake system of a type having a master brake cylinder, at least one wheel brake, a pump, a low-pressure accumulator and a high-pressure accumulator, as well as inlet and outlet valves for the control of the brake pressure and an isolating valve for shutting off the master brake cylinder. The isolating valve and the inlet valve are incorporated in series in the brake line which links the master brake cylinder to the wheel brake. The outlet valve is inserted in the return line which links the wheel brake to the low-pressure accumulator. The pump delivers fluid from the low-pressure accumulator into the high-pressure accumulator. A non-return valve is in the brake line between the isolating valve and the inlet valve.

A brake unit of this kind is known from the German Patent Application published without examination, No. 3,603,533. In that brake unit, the master brake cylinder is isolated from the brake circuit during a brake pressure control action. Hydraulic fluid is withdrawn from the wheel brake cylinders in order to reduce the pressure in the wheel brakes. The hydraulic fluid is conveyed by a pump into a high-pressure accumulator. In order to bring about a renewed pressure build-up, a relevant inlet valve is opened so that hydraulic fluid is conveyed back from the accumulator into the wheel brakes. The maximum receiving capacity of the accumulator is such that the accumulator is capable of holding the total volume of hydraulic fluid which is contained in the wheel brake cylinders. Such a requirement may, for instance, come about if and when the friction conditions between the tires and the road surface should suddenly change from high to low friction coefficients.

Such an accumulator requires a considerable mounting space. It is, therefore, the object of the invention to provide a brake unit with a high-pressure low volume accumulator which allows a large volume flow to be applied in the brake system.

SUMMARY OF THE INVENTION

The object of the invention is achieved in that the the high-pressure accumulator is connected through an accumulator valve to a relief line, acting as redirect means to redirect pump outflow away from the high pressure accumulator to a lower pressure region in the circuit when the accumulator becomes fully charged.

The relief line may direct flow to the master cylinder or the low-pressure accumulator. In the former case, hydraulic fluid will be withdrawn from the closed brake circuit and will be conveyed back into the master brake cylinder. This hydraulic fluid will be conveyed back into the brake circuit if and when the high-pressure accumulator is emptied and the isolating valve is opened again on account of an increased demand of hydraulic fluid to the wheel brake.

In the other case, the hydraulic fluid will remain in the closed brake circuit, but it will be stored in the low-pressure accumulator. Although the low-pressure accumulator will require a corresponding receiving volume, such a large volume low-pressure accumulator is easier to provide than a corresponding high-pressure accumulator having an identical receiving volume.

The valve for the control of the relief line may now be constituted by the typical relief pressure valve which opens and releases the relief line in the event of a determined pressure in the high-pressure accumulator. The difficulty of this configuration is to set the opening pressure of the relief pressure valve to the maximum accumulator pressure. In order to avoid this problem, the accumulator valve may alternatively be actuated depending on the travel of the accumulator piston. As soon as the high-pressure accumulator has reached its maximum receiving volume, the accumulator valve will open and will release the connection.

If a connection exists in the latter case which leads to the master brake cylinder, then it is preferred to insert a non-return valve between the accumulator valve and the master brake cylinder, so that if the pressure of the master cylinder exceeds the accumulator pressure, no hydraulic fluid may flow from the master brake cylinder into the brake circuit.

In order to minimize the number of external connections at the accumulator which is combined with the isolating valve, the relief line may, alternatively, also be directed to the outlet chamber of the isolating valve. In that case, the relief line comprises a duct system in the accumulator piston, the non-return valve allowing it to be positioned in the valve body of the isolating valve.

The accumulator valve may be disposed in different manner within the accumulator piston. One possibility consists in that is for the valve seat to be formed on the accumulator piston and the valve body is actuated through a tappet which is engaged with a rigid stop on the accumulator housing.

Another possibility is for the valve seat to be formed on the accumulator housing, a tappet being molded to the valve body which interacts through a lost motion-type coupling with the accumulator piston. The lost motion of the coupling corresponds to the travel of the accumulator piston in undergoing of the maximum filling.

In case the relief line ends up in the low-pressure accumulator, a limitation of the receiving capacity of the low-pressure accumulator may be envisaged. For this purpose, a second accumulator valve is provided which opens as soon as the low-pressure accumulator has reached its intended filling degree. Then a connection will be established between the low-pressure accumulator and the supply tank associated with the brake system.

A further idea consists in that the maximum accumulator pressure is not determined exclusively by an accumulator spring but also by the pressure in the wheel brake cylinder. Moreover, it will be advantageous to connect the relief line either to the master brake cylinder or, alternatively, to the low-pressure accumulator depending on the filling level of the low-pressure accumulator.

The described brake unit may be applied not only for a brake slip control but also for a traction slip control. For that latter purpose, the master brake cylinder is connected to a suction line which leads to the low-pressure side of the pump. The pressure-reduction line is simultaneously blocked. In this context, the suction line is separated with respect to the low-pressure accumulator by a non-return valve which shuts off in the direction of the low-pressure accumulator. The switching function is realized by a 3/2-way valve.

In the following, different embodiments of the invention will be illustrated with reference to twelve Figures.

DETAILED DESCRIPTION

Figure 1:
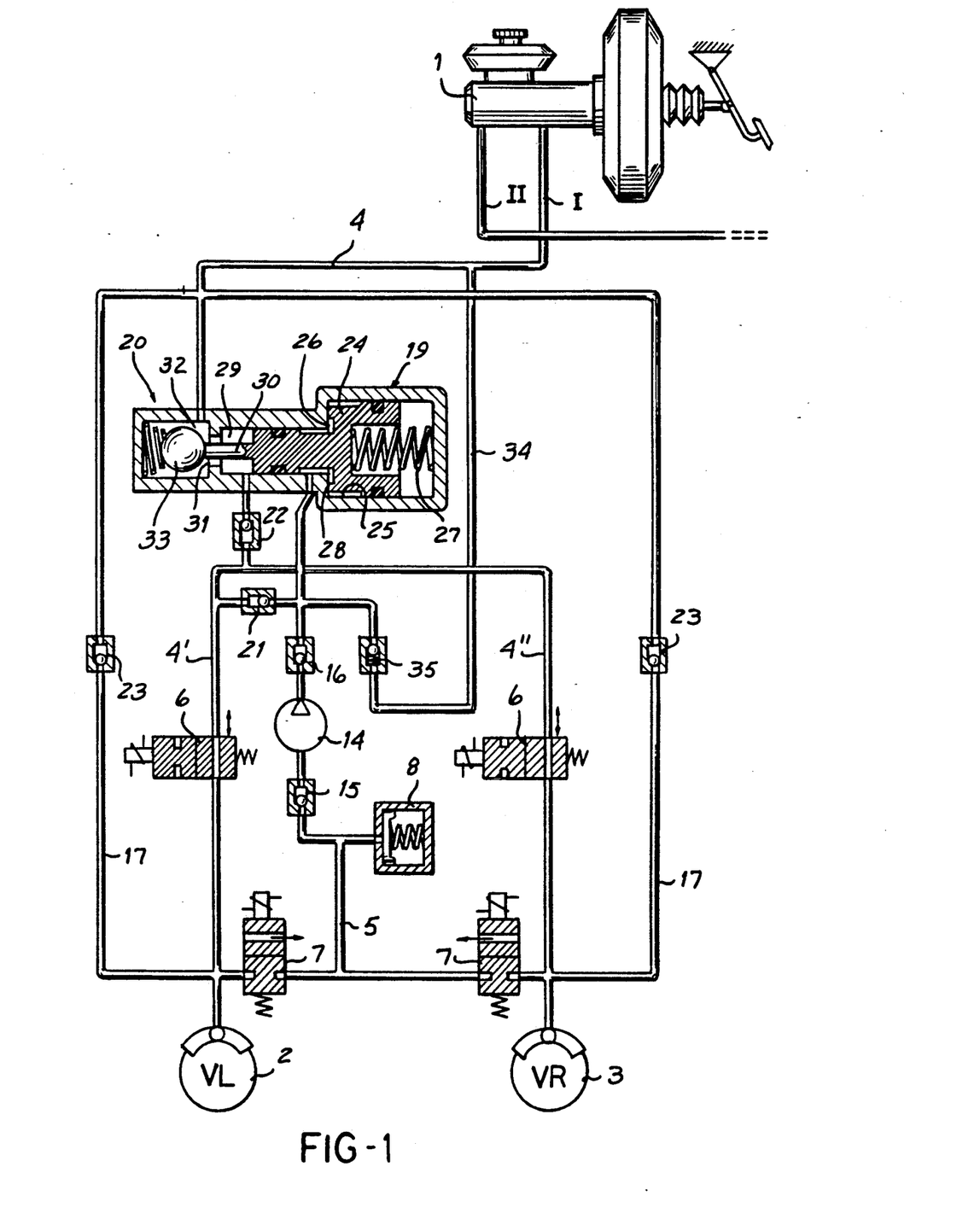
FIG. 1 is a diagram of a hydraulic brake unit with a relief pressure valve between the accumulator chamber and the master brake cylinder.

The brake unit shown in FIG. 1 is comprised of a tandem master brake cylinder 1 with two power chambers which are separated from each other by a floating piston. The power chambers are pressurized by actuation of the pedal which is illustrated symbolically. Each power chamber is associated with a brake circuit I, II, brake circuit I comprising the brakes of the front wheels 2 and 3 and brake circuit II associated with the wheel brakes of the rear wheels which are not shown in the drawing. Since the brake circuits I and II have an identical set-up, only one brake circuit has been illustrated in the drawing.

From one power chamber of the master brake cylinder 1, a branched brake line 4 (branch lines 4′, 4″) leads to the wheel brakes. An inlet valve 6 is inserted in each branch line 4′, 4″. The inlet valve 6 is actuated electromagnetically. In its basic position, it maintains the brake line open, and in its switching position it shuts it off. Each brake circuit is associated with a low-pressure accumulator 8 which is in connection with the wheel brakes 2, 3 through a branched return line 5. In each branch line of the return line 5, an outlet valve 7 is inserted which is actuated electromagnetically. In its basic position, outlet valve maintains the return line blocked and opens it in its switching position.

The inlet and outlet valves 6 and 7 are supplied with switching signals by an electronic control unit which is not shown in the drawing, the control unit monitoring the rotational behavior of the wheels by means of sensors and generating the switching signals on the basis of a control algorithm in the well known manner. In order to reduce the pressure in the wheel brakes, hydraulic fluid is let off through the outlet valve 7 into the low-pressure accumulator 8. In order to increase the pressure in the wheel brakes, hydraulic fluid is supplied to the wheel brakes through the inlet valve 6. In the embodiment of FIG. 1 the pressure in the wheel brakes of the front wheels is controlled individually. In a brake circuit for the rear wheel brakes, a common control of the wheel brake pressure may, alternatively, be envisaged.

For each brake circuit a pump 14 is provided which aspirates hydraulic fluid through a suction valve (non-return valve) 15 from the low-pressure accumulator 8 and conveys it through a discharge valve 16 (non-return valve) into a high-pressure accumulator 19. Furthermore, an isolating valve 20 is provided which shuts off the main brake line 4 as soon as a brake slip control action starts. In the embodiment of FIG. 1, the isolating valve 20 is actuated mechanically, by the accumulator piston 24 of the high-pressure accumulator 19. The accumulator chamber 26 connected through a non-return valve 21 with the brake line 4 downstream of isolating valve 20. The non-return valve 21 opens in the direction of the brake line 4. The non-return valve 21 during a normal braking action prevents hydraulic fluid from reaching the accumulator, as a result whereof the brake line 4 would be shut off.

Another non-return valve 22 is inserted in the brake line downstream of the isolating valve. The non-return valve 22 opens in the direction of the wheel brake. In order to make sure that a complete pressure decrease may take place in the wheel brakes upon a braking action, each wheel brake 2, 3 is linked directly to the master brake cylinder 1 through a pressure-reduction line 17 into which non-return valves 23 are inserted. The non-return valves 23 open in the direction of the master brake cylinder 1.

The high-pressure accumulator 19 is furnished with a stepped piston 24 comprising an accumulator piston, which sealingly slides in a stepped bore 25. An annular chamber is formed at the transition from the smaller to the larger step, comprising an accumulator chamber 26. At the front side of the larger piston section an accumulator spring 27 is engaged, which retains the stepped piston 24 against a stop 28.

In this position the annular chamber 26 has its smallest volume. In the event of filling of the accumulator chamber 26, the stepped piston 24 moves away from stop 28 against the pressure of the spring 27, increasing the volume of chamber 26. The pressure within the accumulator chamber 26 is thus determined by the pre-stressing force of the accumulator spring 27. The accumulator 19 is combined with the isolating valve 20. The isolating valve 20 is comprised of an outlet chamber 29 and of an inlet chamber 32 which are connected to each other through a passage bearing a sealing seat 31. The valve ball 33 is positioned within the inlet chamber 32 which is connected to the master brake cylinder. The smaller piston step of the stepped piston 24 is succeeded by a tappet 30 which penetrates all the way through the passage and is in abutment against the valve ball 33. When the accumulator piston 24 is in its basic position, tappet 30 keeps the valve ball 33 at a distance from the valve seat 31, so that a hydraulic fluid connection is established between the inlet chamber 32 and the outlet chamber 29. The brake line 4 is then kept open. When the accumulator is being filled so that the accumulator piston 24 moves to the right as viewing the drawing, then the tappet 30 will be pulled out of the passage so that the valve ball 33 may become seated on the valve seat 31. The brake line is then blocked. It will be opened again only when the accumulator piston 24 has reached its basic position.

The brake unit is furnished with a relief line 34 which leads from the accumulator chamber 36 to the master brake cylinder 1. A relief pressure valve 35 which opens in the direction of the master brake cylinder 1 is inserted in relief line 34. As soon as the accumulator 36 is completely filled, further hydraulic fluid which is supplied by the pump may be conveyed through the relief pressure valve 35 into the master brake cylinder 1.

The brake unit of FIG. 1 works according to the following scheme:

When the pedal is actuated, hydraulic fluid will be displaced out of the power chamber of the master brake cylinder 1 to the associated wheel brakes via the valve 20, the non-return valve 22, and through the open inlet valve 6 to the wheel brake. A pressure will be built up in the brake circuits and in the associated wheel brakes which corresponds to the pedal force.

When the brake is released, hydraulic fluid will flow from the wheel brakes through the pressure-reduction line 17 and the non-return valves 23 back into the master brake cylinder 1.

The rotational behavior of the wheels is constantly monitored by means of sensors, the sensor signals being processed by an electronic processing unit which is not illustrated in the drawing and which generates, in its turn, switching signals for the inlet and the outlet valves 6, 7 as well as for the pump drive.

Now, if it is detected that one of the wheels threatens to lock, then the unit will switch into the anti-locking control mode.

In the control mode, the inlet valve 6 and the outlet valve 7 of the wheel which threatens to lock are respectively closed and opened. Hydraulic fluid will, thus, flow out of the brake of that wheel into the low-pressure accumulator 8. Simultaneously, the drive of the pump 14 will be switched in, so that the hydraulic fluid will be conveyed forth into the accumulator chamber 26 of the high-pressure accumulator 19. As a result, the stepped piston 24 will move against the force of the accumulator spring 27 to the right, and as a result, on account of the prestress of said spring 27, immediately a considerable pressure will build up which ranges between 150 and 200 bar, depending on the dimensioning of the brake unit.

Due to the movement of said stepped piston 24, the tappet 30 will release the valve ball 33, so that the latter will seat itself onto the valve seat 31 closing the isolating valve 20.

With the volume of hydraulic fluid contained downstream of the isolating valve it will now be possible to carry out a brake pressure control action. By switching of the inlet and outlet valves 6 and 7, hydraulic fluid is allowed to be conveyed from the accumulator into the wheel brake (pressure increase) or from the wheel brake back into the accumulator (pressure decrease).

In most cases, a braking action takes place on a surface having a constant coefficient of friction. The wheel brake pressure will, therefore, fluctuate only slightly around a constant average value. The volume of hydraulic fluid which is conveyed in either direction between the wheel brake and the accumulator will be correspondingly small.

Now, a situation may, however, arises in which the coefficient of friction changes markedly, for example, from high coefficients of friction to low ones. This will have the result that a considerable volume of hydraulic fluid has to be conveyed from the wheel brake into the high-pressure accumulator 19. The invention is concerned with dealing with this situation. The receiving capacity of the high-pressure accumulator is selected sufficiently small that only a volume of hydraulic fluid will be received which is conveyed for the typical situation, that is to say, without marked change in the friction of the road surface. As soon as the limit of the receiving capacity has been reached, the pump will deliver its output into the relief line 34, into which the relief pressure valve 35 is incorporated, back into the master brake cylinder 1. As a result of this, a determined volume of hydraulic fluid will be withdrawn from the closed brake circuit. The spring force which determines the opening pressure of the relief pressure valve has to be harmonized to the pressure usually generated within the master cylinder and to the desired accumulator pressure.

If the pressure in the wheel brakes should have to be increased again to a considerable extent, then first of all the hydraulic fluid which exists in the accumulator 19 will completely be conveyed into the wheel brake. When the accumulator is empty, the isolating valve 20 will open automatically, so that hydraulic fluid will again be conveyed from the master brake cylinder 1 into the brake circuit.

Figure 2:
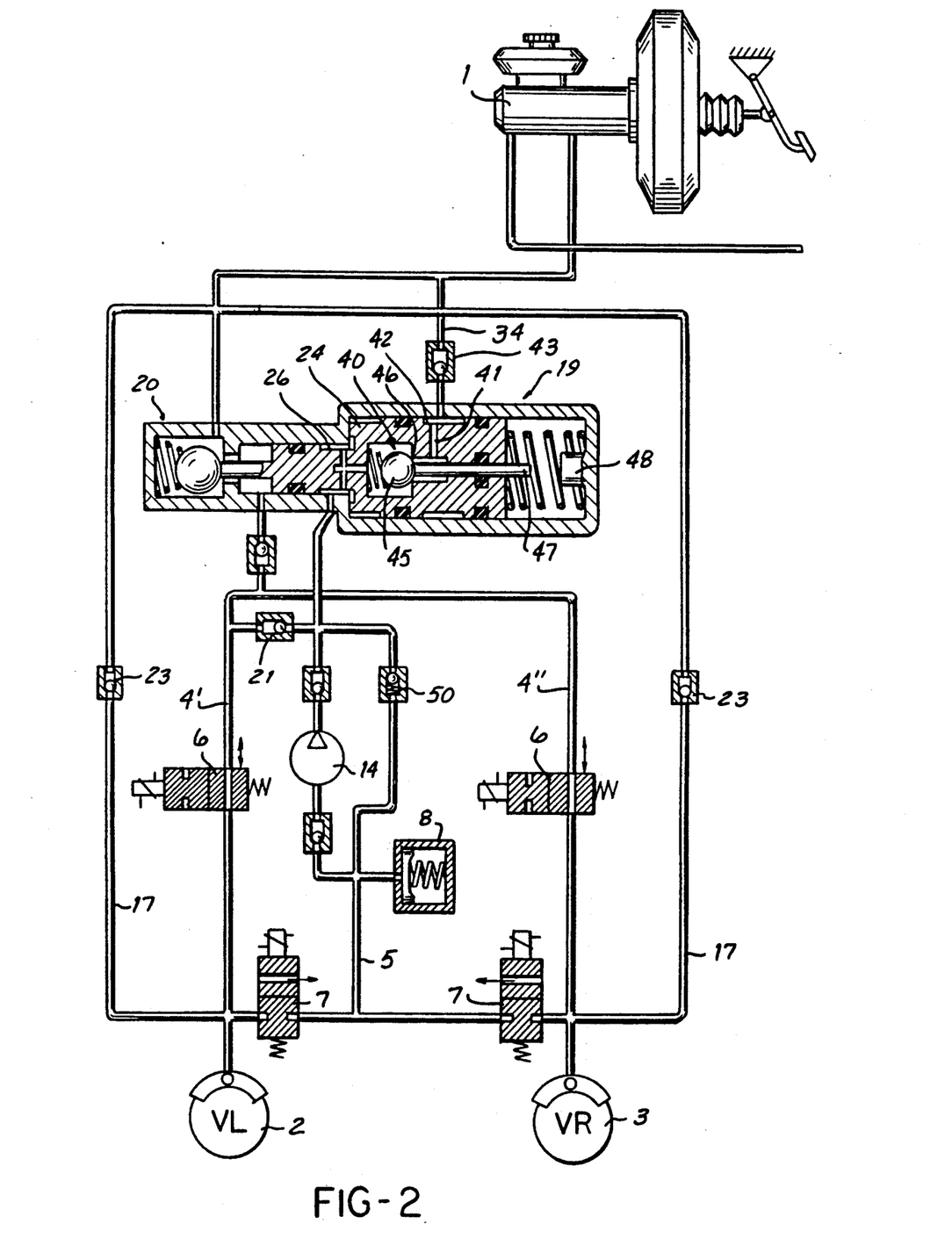
FIG. 2 is a diagram of a brake unit with a travel-controlled valve between the high-pressure accumulator and the master brake cylinder.

In FIG. 2, a brake unit is illustrated which corresponds substantially to the unit according to FIG. 1. The relief pressure valve 35 is replaced by a travel controlled accumulator valve 40. The accumulator valve 40 is located within the accumulator piston 24. For this purpose, accumulator piston 24 is provided with a duct system 41 which connects the accumulator chamber 26 to an annular groove 42 on the accumulator piston. From the annular groove 42, the relief line 34 leads to the master brake cylinder 1, via the brake line 4, a non-return valve 43 being inserted in relief line 34 which opens in the direction of the master brake cylinder.

The duct system is comprised of a chamber within which a valve body 45 is disposed. Valve body 45 comprises and accumulator valve element which interacts with a sealing seat 46. A tappet 47 passes all the way through the accumulator piston 24 in an axial direction and is abutted against the valve body 45. The tappet 47 is abuttable against a stop 48 at the housing of the accumulator.

In the illustrated basic position of the accumulator piston 24, tappet 47 is positioned at a distance from the stop 48, so that the valve ball 45 is in abutment against the sealing seat 46. The connection of the accumulator chamber 26 to the master brake cylinder 1 is blocked. When the accumulator is filled, the accumulator piston 24 will be shifted to the right as illustrated in the drawing, as a result whereof the tappet 47 will engage the stop 48 and the valve ball 45 will be lifted off from the sealing seat 46. A connection will, thus, be established between the accumulator chamber and the master brake cylinder through the non-return valve 43.

Thus relief flow pressure means is provided which communicates the accumulator chamber with a low pressure region under the control of the accumulator valve element comprised of valve body 45, which is shiftable by movement of the accumulator piston 24 to open communication of the relief flow passage means.

Furthermore, a relief pressure valve 50 may be envisaged which connects the high-pressure accumulator 19 to the low-pressure accumulator 8. This is, however, not absolutely necessary. For the rest, the brake unit corresponds to that according to FIG. 1. Also the functional scheme is similar. If the situation should arise that more hydraulic fluid is withdrawn from the wheel brakes than the high-pressure accumulator can hold, then the accumulator valve 40 will open, so that hydraulic fluid may flow from the accumulator chamber 27 through the non-return valve 43 into the master brake cylinder 1.

Figure 3:
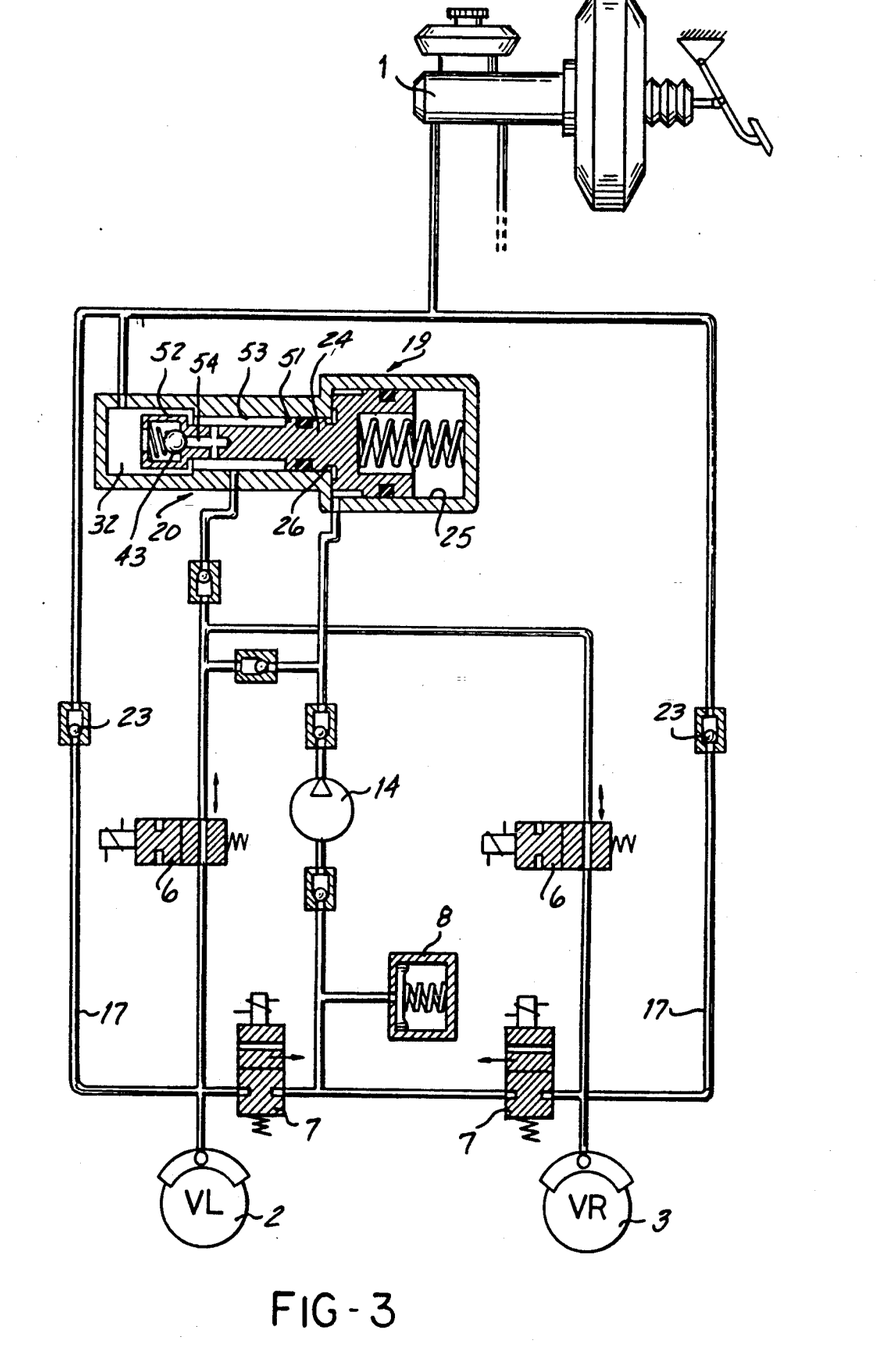
FIG. 3 is a diagram of a brake unit with a travel-controlled valve between the high-pressure accumulator and the brake line.

FIG. 3 represents a modification of the brake unit according to FIG. 2. The closing body 52 of the isolating valve 20 is integral with the accumulator piston 24. The outlet chamber is formed by an annular groove 53 between a first land 51 and a second land 52 at the smaller section of the stepped piston 24. When the high-pressure accumulator 19 is being filled for the first time, the stepped piston 24 will travel to the right as viewing the drawing. As a result, first of all the second land 52 will be drawn into the corresponding step of the stepped bore 25, so that the inlet chamber 32 and the outlet chamber 53 will be separated from each other. The isolating valve 20 is thereby closed. When the accumulator reaches its total filling, the first land 51 here constituting the accumulator valve element passes out of the smaller range of the stepped bore 25 into the larger range of the stepped bore 25. In this way, a connection will be established between the accumulator chamber 26 and the annular groove 53.

The latter is in connection, on its part, through a duct system 54 in the accumulator piston 24 with the inlet chamber 32, said duct system 54 accommodating the non-return valve 43. As a result, an outlet chamber comprised of annular groove 53 will be in connection through the non-return valve 43 with the inlet chamber 32.

The advantage offered by this embodiment as compared to that according to FIG. 2 consists in that a separate part for a relief line is saved. Moreover, seals will be saved, and the non-return valve 43 will allow to be adjusted more easily.

Figure 4:
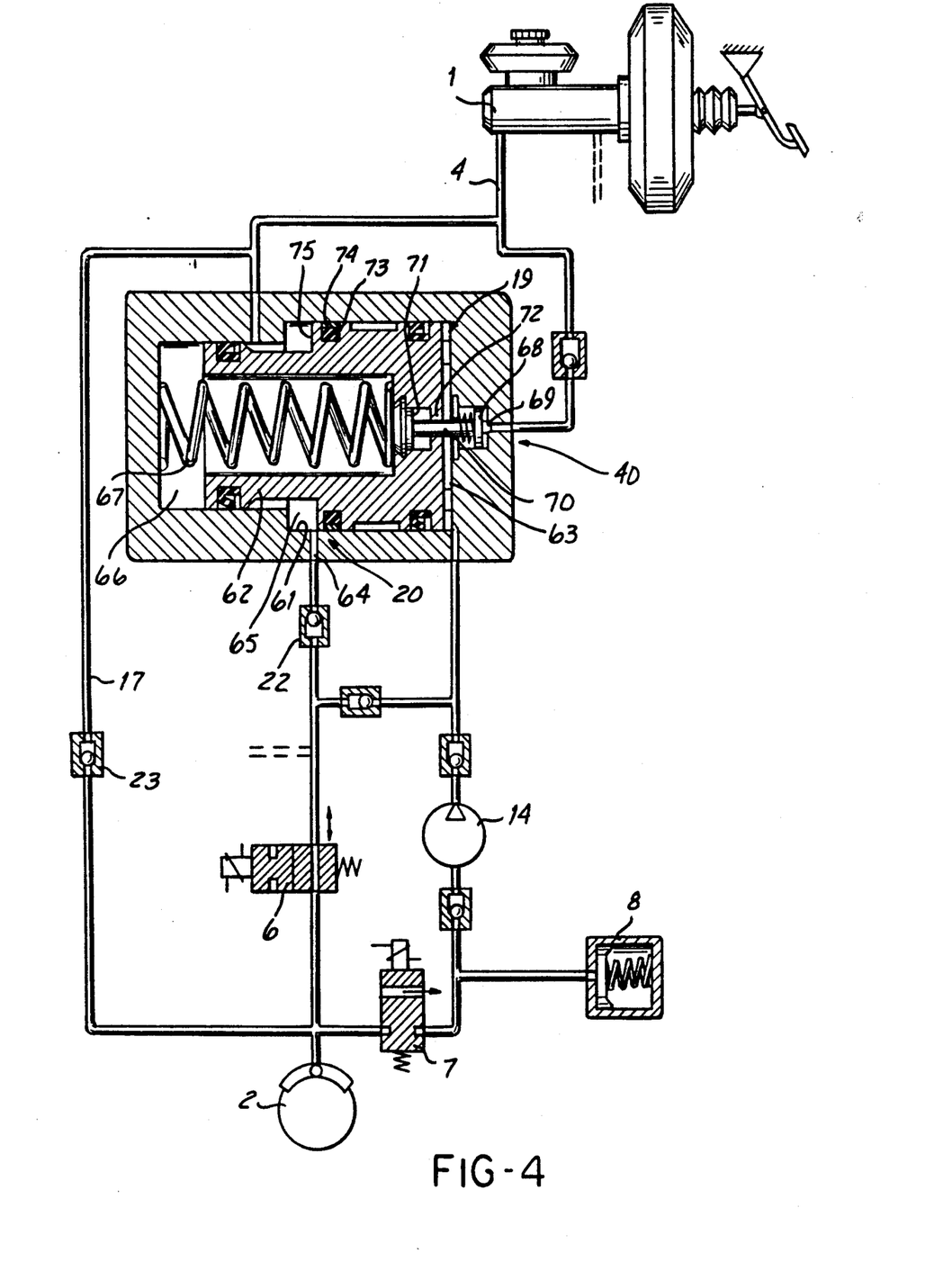
FIG. 4 is a diagram of a brake unit with a travel-controlled valve which interacts through a lost motion-type coupling with the accumulator piston.

The brake unit according to FIG. 4 corresponds in principle to the unit according to FIG. 2. The embodiment of the high-pressure accumulator 19 of the isolating valve 20 features some advantageous differences.

An appropriately shaped stepped piston 62 is sealingly guided within a housing 60 with a stepped bore 61. A first chamber 63 which is defined by the front side of the larger piston step is in connection with the outlet of the pump 14 and forms the accumulator chamber 63. The stepped chamber 65 at the transition from the smaller to the larger step is connected, on one side, with the master brake cylinder 1 and, on the other side, through the non-return valve 22 with the inlet valve 6. The position of the port 64 is selected such that the larger piston step passes over it and seals it during filling of the high-pressure accumulator 19. The front side of the smaller step defines a second chamber 66 which is constantly vented to the atmosphere and which accommodates the accumulator spring 67.

The accumulator valve 40 is furnished with a valve body 68 having a valve element which is in abutment against a valve seat 69 on the housing 60 of the accumulator. A stem 70 on the valve body 68 engages the stepped piston 62 in such a manner that a collar 71 of the stem 70 comes to be positioned opposite a stop 72 on the stepped piston 62 creating a last motion connection. The distance between said collar 71 and stop 72 corresponds to the sliding travel of the stepped piston 62 when the accumulator 19 is completely filled. The portion of the stepped piston 62 which passes over the port 64 is provided with a seal which is comprised of an O-ring 73 and of a slip ring 74 made of wear resistant material, for example of PTFE.

The functional scheme of the unit corresponds to the scheme which has already been described above. When the high-pressure accumulator 19 is being filled, the stepped piston 62 will be shifted to the left against the force of the accumulator spring 67. As a result, firstly the port 64 will be covered and the brake line interrupted. When the high-pressure accumulator 19 reaches its maximum filling degree, the collar 71 will come to be abutted against the stop 72, so that the step 70 of the valve body 68 will be carried to the left by the stepped piston 62 lifting the valve element from the valve seat 69. The accumulator valve 40 will thus be opened, so that hydraulic fluid which is additionally conveyed into the accumulator 19 is directed to the master brake cylinder 1 through the relief line 34.

It is an important feature of this embodiment that the annular surface 75 of the stepped piston 62 which projects into the stepped chamber 65 is subject to the pressure of the master cylinder 1. In this way, the pressure of the master cylinder contributes in determining the accumulator pressure. Thus, the pressure in the master cylinder acts in the sense of an opening of the isolating valve 20 so that the probability that the isolating valve 20 remains in its locking position after a control action will be reduced.

It has already been mentioned in the explanations regarding the embodiment according to FIG. 2 that a relief pressure valve 50 may be incorporated between the high-pressure accumulator 19 and the low-pressure accumulator 8. This is also included in the embodiment according to FIG. 5, in which an accumulator valve between the high-pressure accumulator 19 and the master brake cylinder 1 is not employed. A quantity of hydraulic fluid which cannot any longer be received by the high-pressure accumulator 19 must be received by the low pressure accumulator 8. This would mean that the holding capacity of the low-pressure accumulator 8 must be increased.

Figure 5:
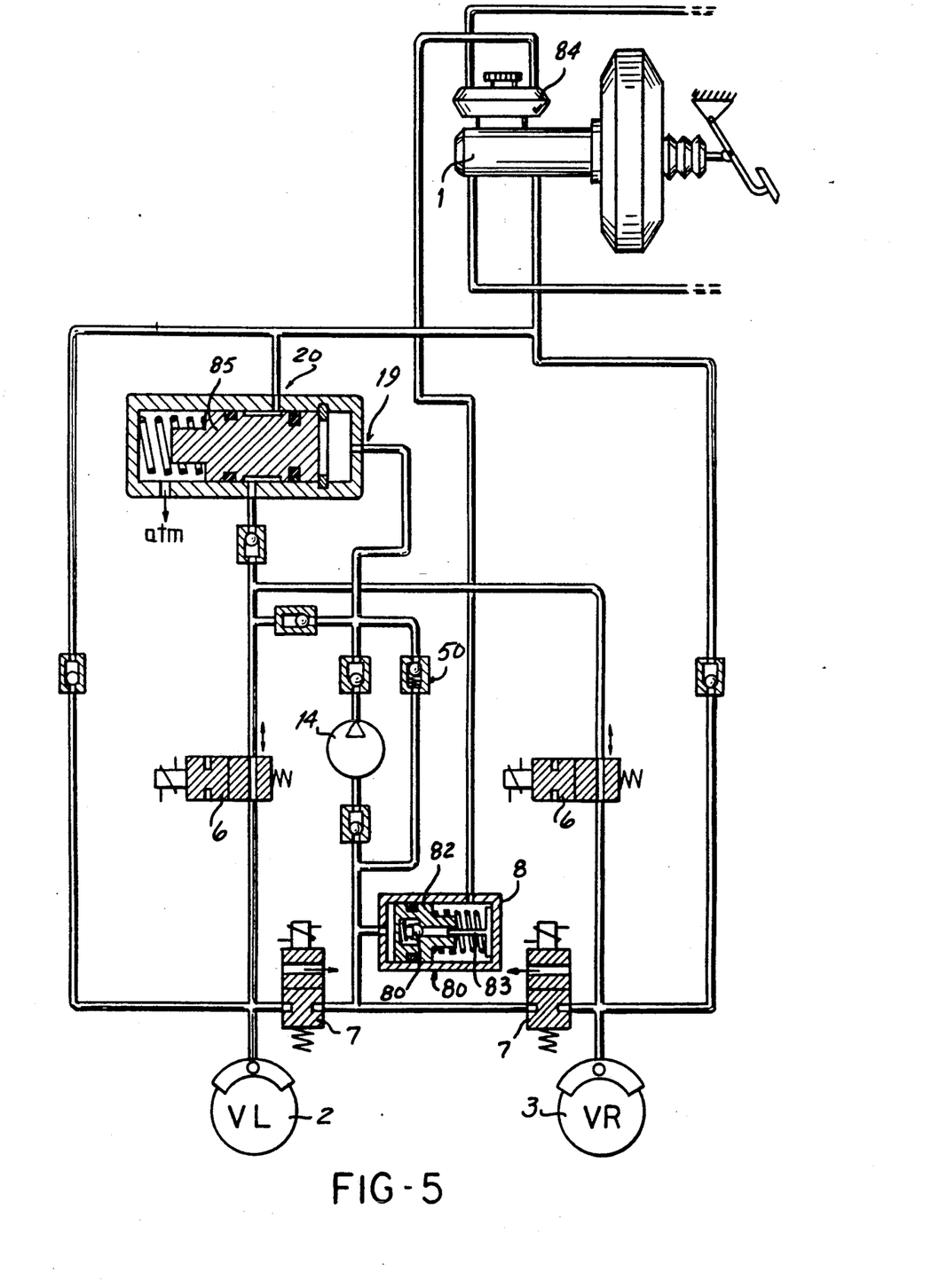
FIG. 5 is a diagram of a brake unit with a device for the discharge of excess hydraulic fluid from the low pressure accumulator into the supply tank.

In order to keep the overall size small, a discharge valve 80 has to be provided which on reaching a determined filling degree opens the low-pressure accumulator 8 toward the supply tank 84 of the brake system. The discharge valve 80 may be a travel controlled valve, the valve body 81 being positioned in the piston 82 of the low-pressure accumulator 8. As soon as the low-pressure accumulator has reached its maximum filling level, a tappet 83 fixed to the housing lifts the valve body 81 off its valve seat, so that the accumulator chamber of the low-pressure accumulator 8 is connected to the supply tank 84 which is typically positioned on the master brake cylinder 1.

By this measure, build up of an excessive pressure in the low-pressure accumulator is precluded which would prevent the outflow of hydraulic fluid from the wheel brake.

In this embodiment, the piston of the high-pressure accumulator 19 is designed as a stepless cylinder piston 85, the isolating valve 20 being a slide valve and the cylinder piston 85 of the high-pressure accumulator 19 performing the function of the valve body.

Figure 6:
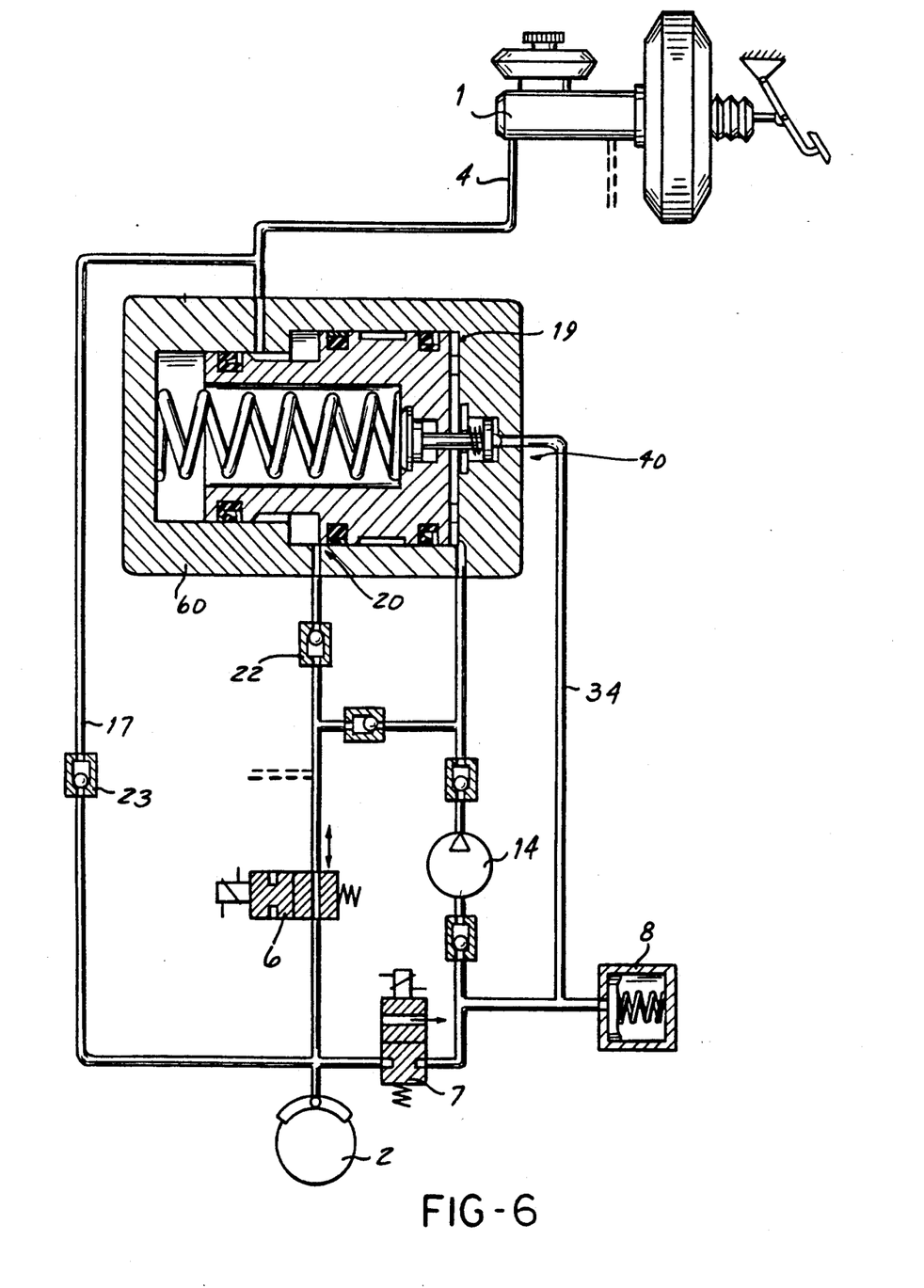
FIG. 6 is a diagram of a brake unit with a travel-controlled valve within the from the low pressure accumulator high-pressure accumulator, with the relief connection leading to the low-pressure accumulator.

As to its structure, the embodiment according to FIG. 6 corresponds to the embodiment according to FIG. 4, so that more detailed explanations need not be given in its regard. The only difference is that the outlet from the accumulator valve 40 is not connected to the master brake cylinder 1 but to the low-pressure accumulator 8 instead. As far as this aspect is concerned, the embodiment of FIG. 6 has a feature in common with FIG. 5. Now, the low-pressure accumulator 8 will have to be dimensioned such that it can receive the volume of the wheel brake cylinder, or, else, a safety unit will have to be provided as a safeguard against excess pressure in the low-pressure accumulator in accordance with FIG. 5.

Figure 7:
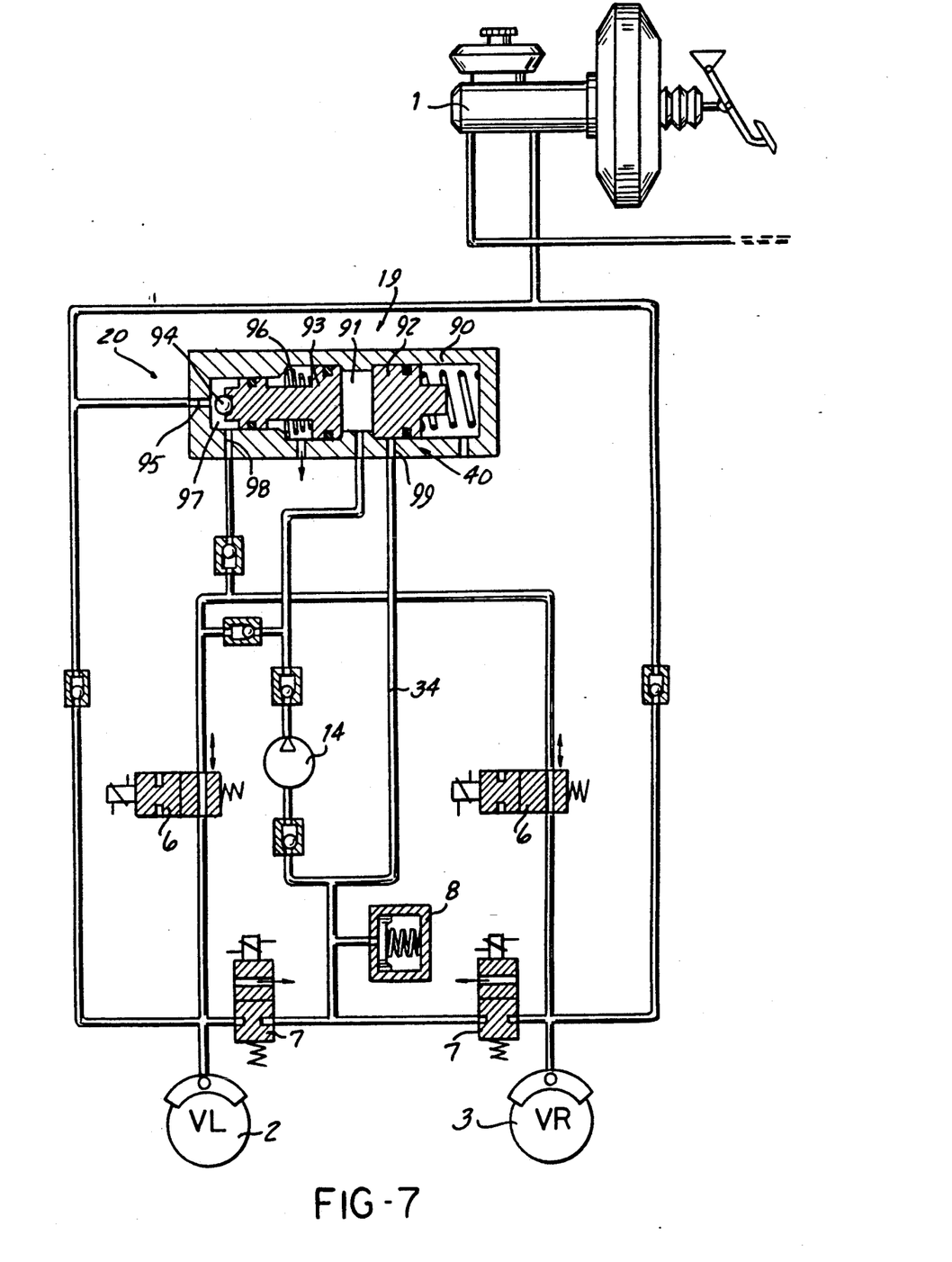
FIG. 7 is a diagram of a brake unit with an isolating valve being actuated by the accumulator pressure.

In FIG. 7, a special embodiment of the accumulator 19 combined with the isolating valve 20 is illustrated. The isolating valve 20 and the accumulator 19 are positioned within a common housing 90. A central chamber 91 is defined by the accumulator piston 92, on one side, and by an actuating piston 93, on the other side. The pump 14 delivers into the central chamber 91. At its end facing away from the central chamber 91, the actuating piston 93 bears a valve body 94 which may be sealingly seated onto a connection 95. Port 95 is linked to the master brake cylinder. A spring 96 engages the actuating piston to urge the actuating piston 93 in a direction such as to open port 95. Port 95 ends up in an outlet chamber 97 which is provided with a second port 98 to which the inlet valve is connected. The accumulator valve 40 comprises a slide valve.

As soon as the accumulator piston 92 has been shifted a determined distance, it will open a port 99 to which a relief line 34 going to the low-pressure accumulator 8 is connected. The actuation of the isolating valve 20 is independent of any movement of the accumulator piston 92 and is triggered by the pressure in the central chamber 91.

It is essential that the actuating piston 93 is subject to the pressure of the master brake cylinder 1. The isolating valve 20 is, therefore, closed against the pressure in the master brake cylinder 1. The active area is the cross-sectional area of the port 95. Now, setting the force of the spring 96 such that jointly with the pressing force at the port 95 it withstands the accumulator pressure, then a rapid opening of the isolating valve 20 will be ensured as soon as the accumulator has been emptied and the accumulator pressure decreases.

Figure 8:
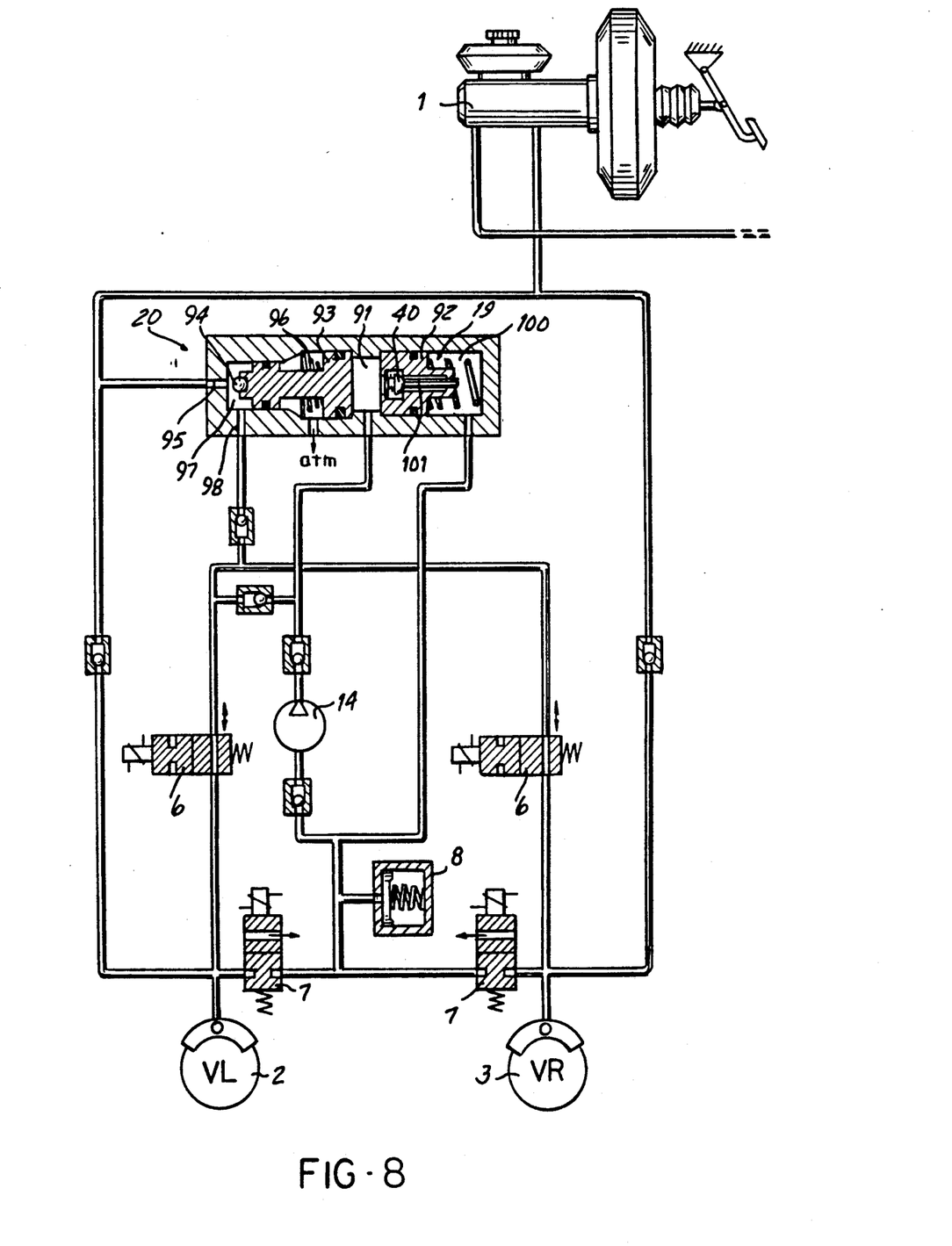
FIG. 8 is a diagram of a brake unit with a counter-pressure chamber pertaining to the accumulator chamber, which is connected to the supply tank.

The embodiment according to FIG. 8 corresponds to the embodiment according to FIG. 7. A difference consists in that the relief line ends up into a counterpressure chamber 100 which is disposed opposite the accumulator chamber 91. It will be appreciated that accumulator chamber 91 and counterpressure chamber 100 are so defined by the opposite sides of the accumulator piston 92. The accumulator valve 40 is configurated as a central valve within the accumulator piston 92, and it is brought into its open position by a tappet 101 as soon as the accumulator has reached its maximum volume. A connection will then exist between the accumulator chamber 91 and the counterpressure chamber 100 and, thus, between the accumulator chamber 91 and the low-pressure accumulator 8.

Figure 9:
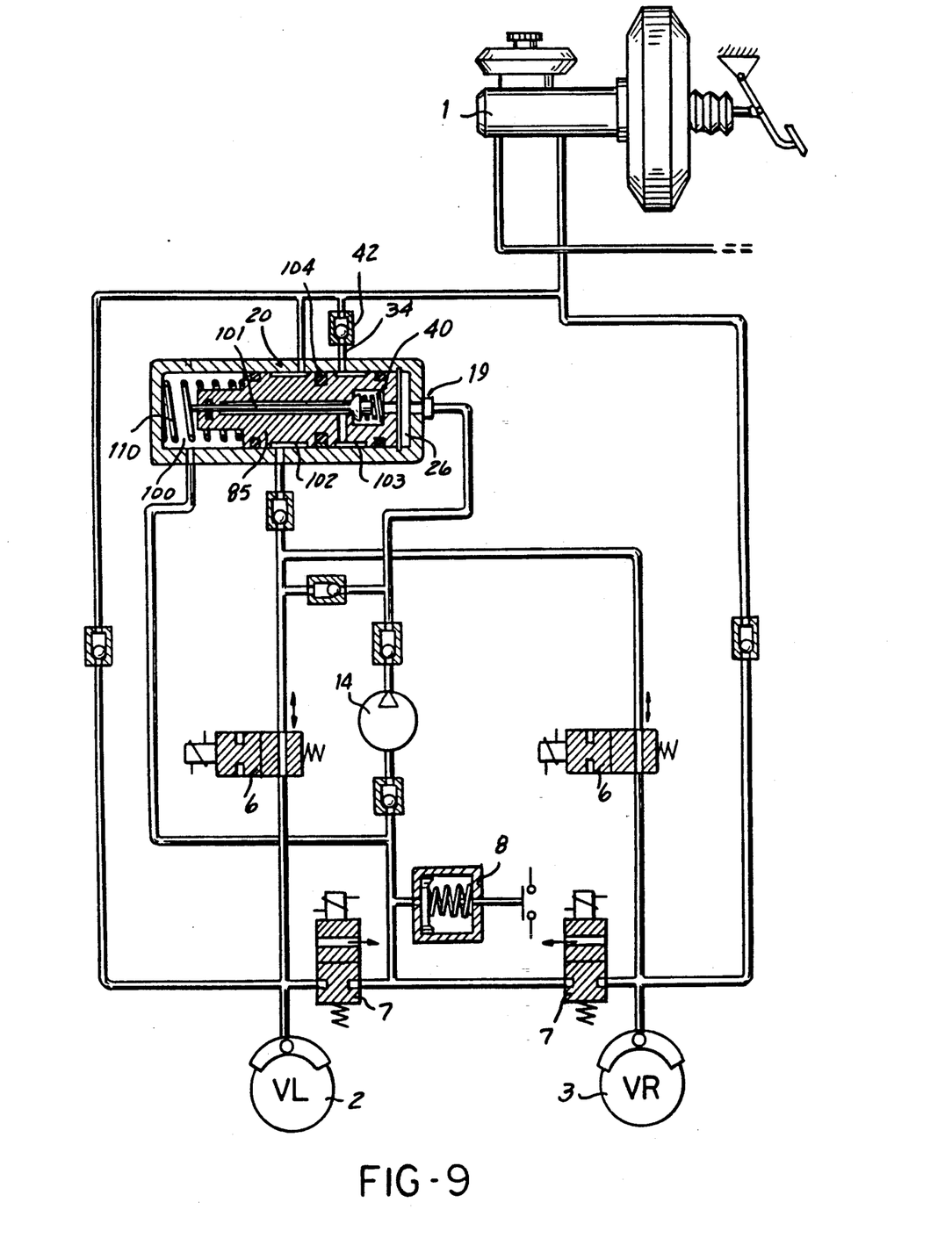
FIG. 9 is a diagram of a brake unit similar to that in FIG. 8 with a travel controlled valve in the connection going from the accumulator to the master brake cylinder.

In FIG. 9, a further development of the brake unit according to FIG. 8 is illustrated. The counterpressure chamber 100 is again connected to the low-pressure accumulator 8. The accumulator valve 40 does, however, not lead into the counterpressure chamber 100 but into the master brake cylinder 1 instead, as is known already from the proceeding embodiments.

The accumulator unit is composed of a cylinder piston 85 with a first annular groove 102 and with a second annular groove 103. An annular land 104 separates the two annular grooves 102, 103 from each other. On one hand, a connection going to the master brake cylinder 1 and, on the other hand, a connection going to the inlet valve end up in said first annular groove 102. As the accumulator piston slides, the land 104 will move before the master cylinder connection, so that the brake line is interrupted. Annular groove 103 is in connection, through the relief line 34, with the master brake cylinder. As is known, a non-return valve 42 is inserted in the relief line 34. The second annular groove 103 is in connection, through a duct system, with the accumulator chamber 26, the accumulator valve 40 being inserted in the duct system. A tappet-actuated seat valve is opened as soon as the accumulator has reached its maximum volume.

This arrangement has the advantage that during a control action, a reserve volume is being developed in the master brake cylinder 1. As the accumulator 19 is being filled, the volume of the accumulator chamber 26, on one hand, is increased and the volume of the counterpressure chamber 100, on the other hand, is decreased. The volume being displaced from there is conveyed into the low-pressure accumulator 8 and is pumped forth into the high-pressure accumulator 19. The latter will rapidly reach its maximum receiving capacity, so that the volume put at disposal additionally will be pumped back into the master brake cylinder 1. The hydraulic fluid from the chamber 100 will, thus, finally end up in the master brake cylinder 1.

Figure 10:
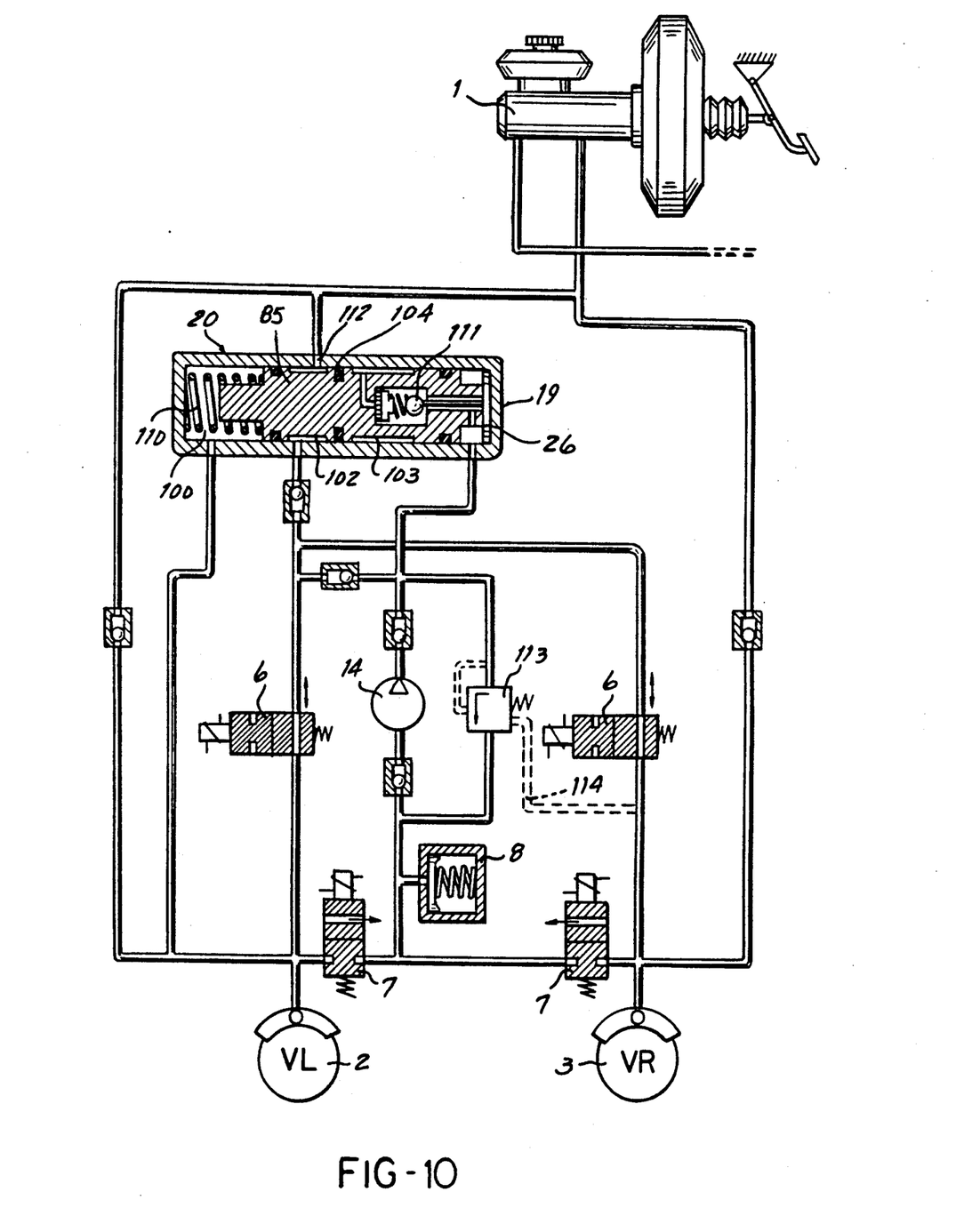
FIG. 10 is a diagram of a brake unit in which the accumulator pressure is substantially controlled by the pressure in the wheel brake cylinder.

A further embodiment is illustrated in FIG. 10. The particular feature of this unit consists in that the accumulator pressure is determined by the pressure in the wheel brake cylinder. Within a housing, the accumulator piston 85 defines, with its one front side, the accumulator chamber 26 which is connected to the outlet of the pump 14 and, with its other front side, a counterpressure chamber 100 which is directly connected to a wheel brake in the brake circuit. Within the counterpressure chamber 100, furthermore, a spring 110 is positioned which has a prestress corresponding to a pressure of approximately 10 bar in the accumulator chamber 26. As long as the accumulator piston 85 does not come to be abutted against a stop, the pressure in the accumulator chamber 26 will, thus, always exceed by 10 bar the pressure in the counterpressure chamber 100.

The accumulator piston 85 is furnished with a first and with a second annular groove 102, 103, the first annular groove 102 being positioned in the brake line and the port 112 to the master brake cylinder 1 being blockable by a land 104 between the grooves 102, 103. This arrangement functions as an isolating valve 20. The second annular groove 103 is connected to the accumulator chamber 26 through an unlockable non-return valve 111 which is open in the basic position of the accumulator piston 85 (when the accumulator chamber has its smallest volume). The non-return valve 111 connects the accumulator chamber 26 to the second annular groove 103, the port 112 to the master brake cylinder ending up in the second annular groove 103 when the accumulator is in the filled condition.

Furthermore, a relief pressure valve 113 is provided between the high-pressure accumulator 19 and the low-pressure accumulator 8. The opening pressure of the relief pressure valve is determined by a spring which has a prestress corresponding to a pressure of approximately 20 bar and by the pressure in the wheel brake of the brake circuit. For this purpose, a control line 114 is disposed directly succeeding a wheel brake.

Alternatively, an arrangement may be envisaged which takes into consideration the brake pressure in both wheel brakes. The relief pressure valve 113 will, therefore, open as soon as the accumulator pressure exceeds the pressure in the wheel brake by 20 bar.

This unit works according to the following scheme: as soon as a brake slip control action starts, the pump 14 will deliver into the accumulator chamber 26 the hydraulic fluid in which has been let off into the low-pressure accumulator 8. The accumulator piston 85 will be shifted to the left as viewing the drawing, and as a result the isolating valve 20 will be closed. Since the forces on the accumulator piston 85 are balanced, the accumulator pressure will exceed the wheel cylinder pressure by approximately 10 bar. As soon as the high-pressure accumulator 19 is filled, the accumulator piston 85 will move against a stop, so that the pressure in the accumulator chamber 26 may increase further. A limitation takes place by the relief pressure valve 113, which opens as soon as the accumulator pressure exceeds the pressure in the wheel brake cylinder by 20 bar. The pump will now deliver back into the low-pressure accumulator 8.

On one hand, the non-return valve 111 has the function to limit the accumulator pressure to the master cylinder pressure and, on the other hand, to put the second annular groove 103 into an unpressurized condition when the brake is not operated.

Figure 11:
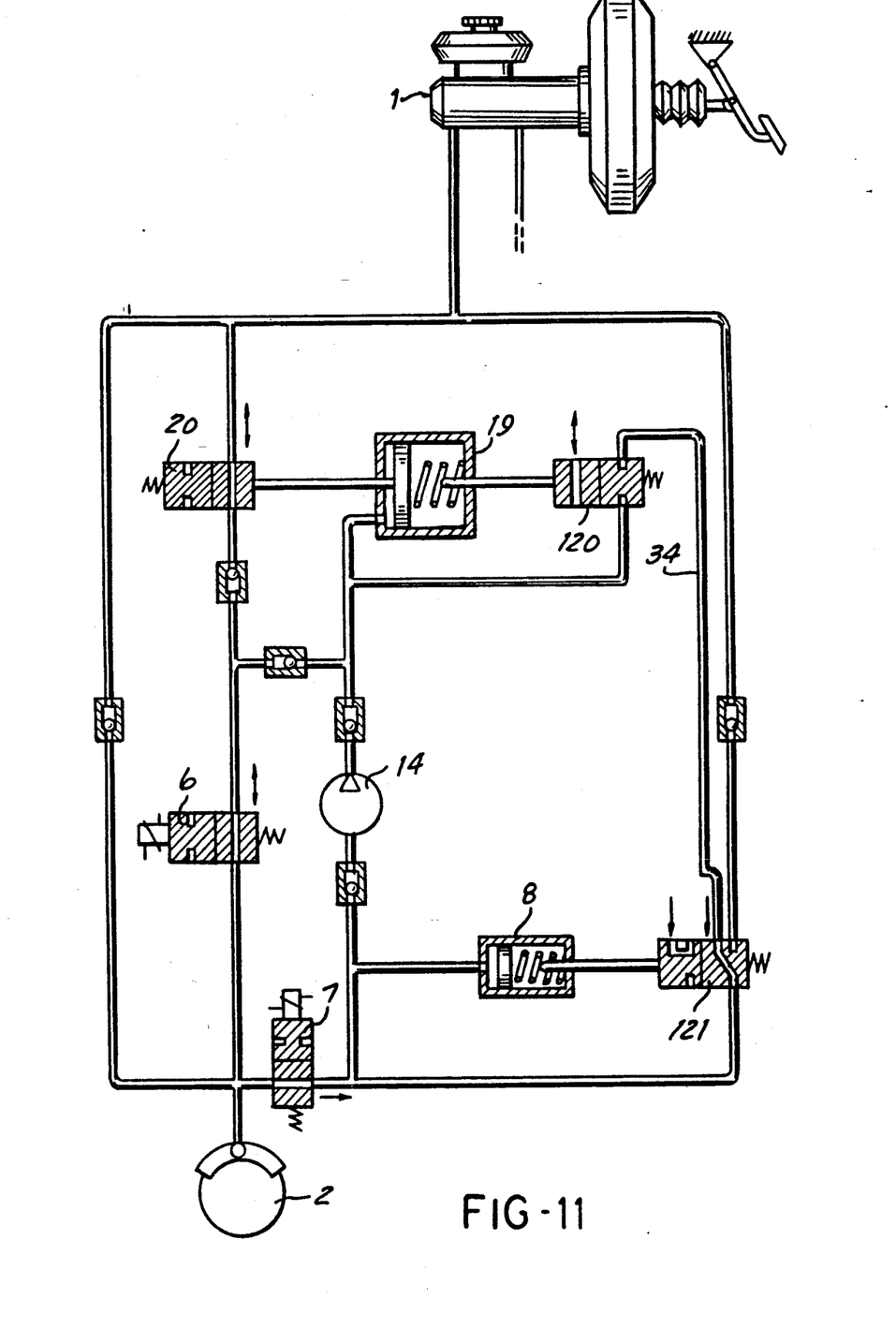
FIG. 11 is a diagram of a brake unit with a switch-over device, the high-pressure accumulator being connected either to the master brake cylinder or to the low-pressure accumulator depending on the filling level of the low-pressure accumulator.

FIG. 11 shows an embodiment in which the pump 14 delivers back into the low-pressure accumulator 8 when the high-pressure accumulator 19 is in the filled condition. For this purpose, a travel controlled first accumulator valve is provided which establishes the connection of the high-pressure accumulator 19 to the low-pressure accumulator 8 when the high-pressure accumulator 19 is in the filled condition. In order, however, to keep small also the overall size of the low-pressure accumulator 8, a second accumulator valve 121 is envisaged which switches over when said low-pressure accumulator is in the filled condition. In that case, the relief line 34 will be isolated from the low-pressure accumulator 8 and will be connected to the master brake cylinder 1.

First of all, the high-pressure accumulator 19 will, thus, be filled at the start of a brake slip control action. As soon as the latter has been filled up, additional hydraulic fluid will be conveyed back into the low-pressure accumulator 8. If also that one is filled up, then the pump 14 will deliver back into the master brake cylinder 1.

Figure 12:
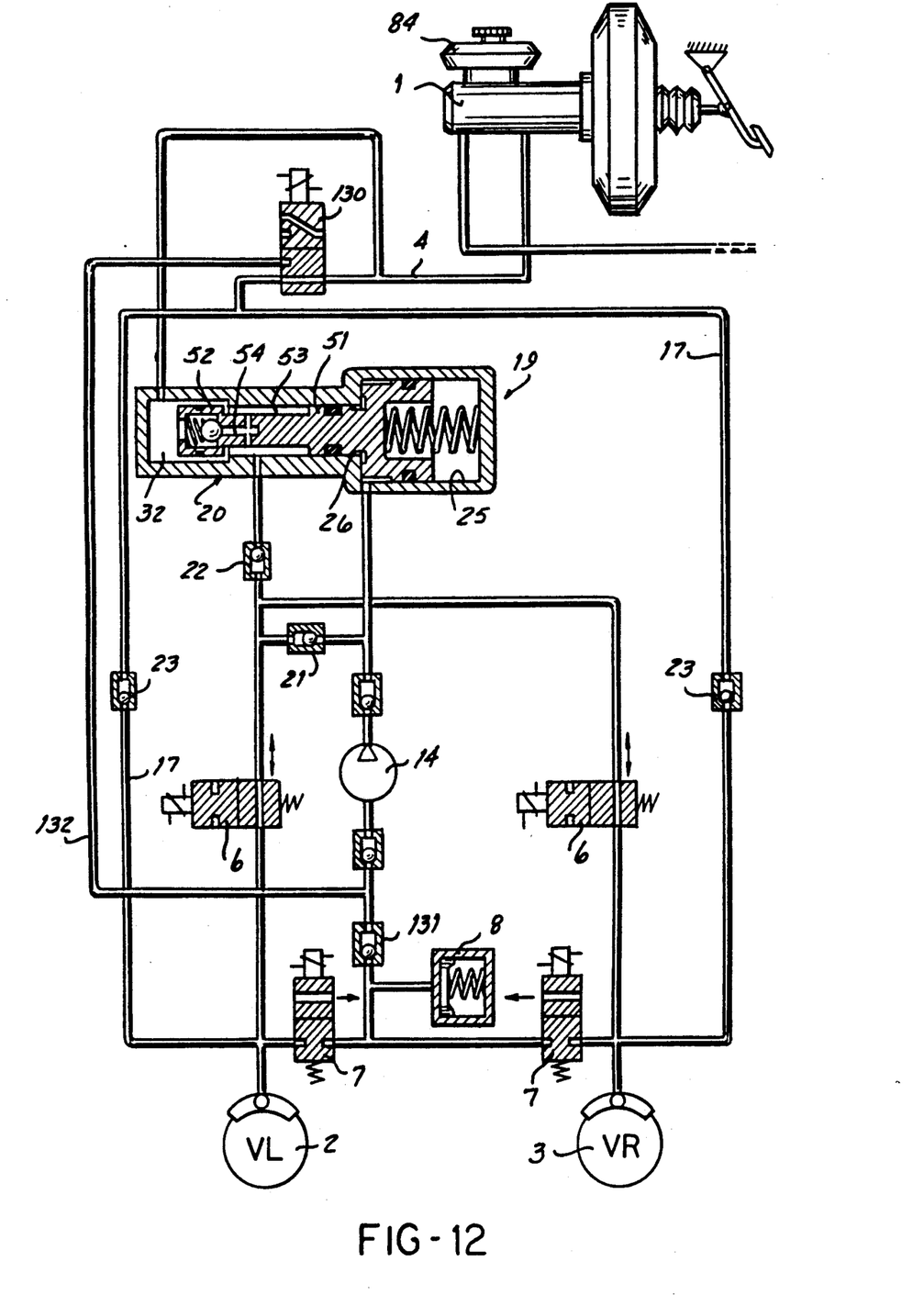
FIG. 12 is a diagram of a brake unit with an extended valve system for traction slip control.

FIG. 12 shows brake units according to the invention not only used for brake slip control, but also for traction slip control. The explanation will be given making reference to the embodiment of FIG. 3 but the other embodiments may also be utilized in a like manner. A 3/2-way valve 130 (traction slip control valve) is required for the purpose, which is actuated electromagnetically and is inserted in the pressure-reduction line 17. In its basic position, the traction slip control valve 130 maintains the pressure-reduction line open. If and when the sensors detect that one of the driven wheels threatens to race, then the traction slip control valve 130 will be actuated and the pump 14 will be switched in. The traction slip control valve 130 will switch into its switching position which is characterized in that the pressure-reduction line 17 is blocked and in that the master brake cylinder 1 is connected through a suction line 132 to the suction or inlet side of the pump 14. The pump 14 may now aspirate hydraulic fluid through the master brake cylinder 1 from the supply tank 84 which latter—as is usual in brake units—is in hydraulic fluid connection with the master brake cylinder as long as the pedal is not operated. The pump 14 delivers the aspirated hydraulic fluid into the high-pressure accumulator 19 and into the brake line, whence it reaches the wheel brake. Any return flow into the master brake cylinder is prevented by the non-return valve 22. A brake pressure will be built up there which counteracts the torque. By actuating the inlet valve 6 and the outlet valve 7, the brake torque may be adjusted in such a manner that the reduction traction torque corresponds to the adhesive forces between the tires and the road surface.

If and when the brake is operated during such a traction slip control case, then hydraulic fluid will be conveyed out of the master brake cylinder 1 through the switched-over traction slip control valve to the inlet side of the pump. From there, it will flow through the pump into the brake line. In order to make sure that the low-pressure accumulator 8 is not filled in such a case, a non-return valve 131 is provided between the suction side and the low-pressure accumulator 8, which closes in the direction of the low-pressure accumulator. The traction slip control case will be ended at the moment of the "adjusting braking", and the traction slip control valve 130 will switch over. From now on, the operation of the brake will take place again through the brake line.

We claim:

1. A hydraulic anti-locking brake unit comprising:
   a master brake cylinder;
   at least one wheel brake;
   a brake line connecting said wheel brake to said master brake cylinder;
   a pump having an inlet and an outlet, said outlet connected to said brake line and wheel brake;
   a low-pressure accumulator and a high pressure accumulator;
   a return line connecting said wheel brake to said low pressure accumulator and said inlet of said pump;
   an inlet valve in said brake line;
   an outlet valve in said return line; control means operating said inlet valve and outlet valve to control pressure at said wheel brake to prevent wheel locking;
   an isolating valve for shutting off communication of said master brake cylinder with said wheel brake;
   said pump conveying fluid from said low-pressure accumulator into said high-pressure accumulator, said high-pressure accumulator connected through a non-return valve to said brake line between said isolating valve and said inlet valve,
   relief valve means causing said high-pressure accumulator to be connected to a low pressure region when the pressure in said high pressure accumulator exceeds by a predetermined level that in said wheel brake; and wherein said brake unit has a supply tank for supplying hydraulic fluid to said master brake cylinder, said low pressure accumulator comprising said lower pressure region, and further including valve means connecting said lower pressure accumulator to said supply tank upon a predetermined filling of said low pressure accumulator to direct further inflow into said low pressure accumulator to said supply tank.

2. The brake unit according to claim 1 wherein said low pressure accumulator includes a housing and a piston movable therein, and wherein said valve means includes means responsive to movement of said piston in said housing to connect said low pressure accumulator to said supply tank.

3. The brake unit according to claim 2 wherein said piston has one and an other end, and wherein said low pressure accumulator housing and said one end of said piston together define an accumulator chamber, said housing and said other end of said piston together define a low pressure chamber; a spring in said low pressure chamber acting on said other end of said piston to exert a force thereon; a fluid connection between said low pressure chamber and said supply tank; and, wherein said valve means is carried by said piston, opening communication between said accumulator chamber and said low pressure chamber upon said piston undergoing a predetermined extent of travel against the force of said spring.

4. A hydraulic antilock brake unit comprising:
at least one hydraulically actuated wheel brake;
a brake pedal operated master cylinder;
said master cylinder and wheel brake interconnected to enable pressurization of said wheel brake by said master cylinder;
pump means having an inlet for drawing in hydraulic fluid and an outlet for discharging pressurized hydraulic fluid, said pump means connected to enable evacuation and pressurization of said wheel brake upon activation of said pump means;
said outlet of said pump means connected with said wheel brake to enable pressurization of said wheel brake by said pump means;
inlet valve means enabling control of communication of said master cylinder and said outlet of said pump means with said wheel brake;
outlet valve means enabling control of communication between said inlet of said pump means and said wheel brake;
high pressure accumulator means to initially receive flow from said outlet of said pump means and create a stored volume of pressurized hydraulic fluid, said high pressure accumulator means comprising a housing having a bore formed therein, an accumulator piston have one and an other end, said piston mounted in said housing bore for slidable movement therein in one or an other direction along said bore, one end of said piston defining in part an accumulator chamber in said housing, said accumulator chamber increasing or decreasing in volume respectively with movement of said accumulator piston in said one or the other direction to cause charging or discharging of said high pressure accumulator means, and spring means acting on said another end of said accumulator piston to resist accumulator piston movement in said one direction increasing the volume of said accumulator chamber;

a counter pressure chamber in said housing defined in part by said other end of said accumulator piston;

a direct fluid connection between said wheel brake and said counterpressure chamber to enable establishing pressure in said accumulator chamber as a function of wheel brake pressure and said spring force by shifting of said accumulator piston;

relief valve means connecting said pump means outlet to a low pressure region in said brake unit upon development of a predetermined pressure difference between said accumulator chamber and said wheel brake;

isolator valve means separate from said relief valve means acting to positively cut off communication between said master cylinder and said wheel brake when said accumulator piston undergoes a predetermined extent of said travel in said one direction.

5. The brake unit according to claim 4 wherein said isolator valve means includes two ports in said high pressure accumulator housing communicating respectively with said master cylinder and said wheel brake and also including a land acting to close communication between said ports upon a predetermined extent of travel of said accumulator piston in said one direction.

6. The brake unit according to claim 5 further including a groove on said accumulator piston adjacent said land opening to said port connected to said master cylinder upon further charging travel of said accumulator piston past said predetermined extent to a fully charged condition and non returnable valve means acting between said accumulator chamber and said groove allowing outflow from said accumulator chamber when said pressure is greater than the pressure of said master cylinder.

7. The brake unit according to claim 6 further including valve opening means acting to open said non returnable valve means when said accumulator piston returns to a position corresponding to a minimum charged condition of said high pressure accumulator means.

8. The brake unit according to claim 4 wherein said relief valve means includes a pressure operated relief valve subjected to pressure in said accumulator chamber and also pressure at said wheel brake to open said relief valve upon development of a predetermined pressure differential between said accumulator chamber and said wheel brake, said relief valve when open connecting said pump means outlet with said low pressure accumulator.

9. The brake unit according to claim 4 further including a stop means engaging aid accumulator piston upon reaching a fully charged condition, thereafter pressure in said accumulator chamber allowed to increase over said wheel brake pressure.

* * * * *